United States Patent
Hebert et al.

(10) Patent No.: US 10,282,419 B2
(45) Date of Patent: *May 7, 2019

(54) MULTI-DOMAIN NATURAL LANGUAGE PROCESSING ARCHITECTURE

(71) Applicant: Nuance Communications, Inc., Burlington, MA (US)

(72) Inventors: Matthieu Hebert, Melocheville (CA); Jean-Philippe Robichaud, Mercier (CA); Christopher M. Parisien, Montreal-Ouest (CA); Nicolae Duta, Winchester, MA (US); Jerome Tremblay, Montreal (CA); Amjad Almahairi, Montreal (CA); Lakshmish Kaushik, Allen, TX (US); Maryse Boisvert, Montreal (CA)

(73) Assignee: Nuance Communications, Inc., Burlington, MA (US)

( * ) Notice: Subject to any disclaimer, the term of this patent is extended or adjusted under 35 U.S.C. 154(b) by 996 days.

This patent is subject to a terminal disclaimer.

(21) Appl. No.: 13/711,814

(22) Filed: Dec. 12, 2012

(65) Prior Publication Data

US 2014/0163959 A1    Jun. 12, 2014

(51) Int. Cl.
*G06F 17/27*    (2006.01)
*G06F 17/30*    (2006.01)

(52) U.S. Cl.
CPC .... *G06F 17/2785* (2013.01); *G06F 17/30684* (2013.01)

(58) Field of Classification Search
USPC .................................................. 704/1–10
See application file for complete search history.

(56) References Cited

U.S. PATENT DOCUMENTS

| | | | |
|---|---|---|---|
| 6,278,967 B1 | 8/2001 | Akers et al. | |
| 6,278,968 B1 | 8/2001 | Franz et al. | |
| 6,760,695 B1 | 7/2004 | Kuno et al. | |
| 7,085,708 B2 | 8/2006 | Manson | |
| 7,363,398 B2 * | 4/2008 | Scott | 704/9 |

(Continued)

OTHER PUBLICATIONS

Final Office Action received in corresponding U.S. Appl. No. 13/632,380 dated Jun. 9, 2014.

(Continued)

*Primary Examiner* — Thuykhanh Le
(74) *Attorney, Agent, or Firm* — Brian J. Colandreo; Michael T. Abramson; Holland & Knight LLP

(57) ABSTRACT

An arrangement and corresponding method are described for multi-domain natural language processing. Multiple parallel domain pipelines are used for processing a natural language input. Each domain pipeline represents a different specific subject domain of related concepts. Each domain pipeline includes a mention module that processes the natural language input using natural language understanding (NLU) to determine a corresponding list of mentions, and an interpretation generator that receives the list of mentions and produces a rank-ordered domain output set of sentence-level interpretation candidates. A global evidence ranker receives the domain output sets from the domain pipelines and produces an overall rank-ordered final output set of sentence-level interpretations.

20 Claims, 5 Drawing Sheets

(56) References Cited

U.S. PATENT DOCUMENTS

| | | | |
|---|---|---|---|
| 7,464,026 B2 | 12/2008 | Calcagno et al. | |
| 7,716,056 B2 | 5/2010 | Weng et al. | |
| 8,175,864 B1* | 5/2012 | Dubiner | G06F 17/2827 704/2 |
| 8,185,397 B2* | 5/2012 | Lee | G10L 15/1815 704/243 |
| 8,731,929 B2* | 5/2014 | Kennewick | G10L 15/22 704/257 |
| 2004/0019588 A1 | 1/2004 | Doganata et al. | |
| 2004/0111255 A1* | 6/2004 | Huerta | G06F 17/278 704/10 |
| 2005/0278287 A1 | 12/2005 | Bao et al. | |
| 2006/0004703 A1* | 1/2006 | Spivack | G06F 17/3089 |
| 2006/0074670 A1* | 4/2006 | Weng | G06F 17/278 704/257 |
| 2006/0074900 A1* | 4/2006 | Nanavati | G06F 17/30637 |
| 2006/0080101 A1* | 4/2006 | Chotimongkol | G06F 17/278 704/257 |
| 2006/0229870 A1* | 10/2006 | Kobal | G10L 15/22 704/252 |
| 2007/0011434 A1* | 1/2007 | Luick | G06F 9/30101 712/11 |
| 2007/0100624 A1* | 5/2007 | Weng | G06F 17/2715 704/257 |
| 2008/0033938 A1 | 2/2008 | Okamoto et al. | |
| 2008/0195601 A1* | 8/2008 | Ntoulas | G06F 17/30616 |
| 2008/0306959 A1 | 12/2008 | Spivack et al. | |
| 2009/0030697 A1 | 1/2009 | Cerra et al. | |
| 2009/0112892 A1* | 4/2009 | Cardie | G06F 17/30719 |
| 2009/0150853 A1* | 6/2009 | Larvet | G06F 8/20 717/101 |
| 2009/0210244 A1* | 8/2009 | Koister | G06Q 30/02 705/319 |
| 2009/0222437 A1* | 9/2009 | Niu | G06F 17/30864 |
| 2009/0319498 A1 | 12/2009 | Zabokritski et al. | |
| 2010/0030552 A1* | 2/2010 | Chen | G06F 17/30734 704/9 |
| 2010/0076995 A1 | 3/2010 | Pan et al. | |
| 2010/0094870 A1* | 4/2010 | Narang | G06F 17/30011 707/736 |
| 2011/0087673 A1 | 4/2011 | Chen et al. | |
| 2011/0258188 A1* | 10/2011 | AbdAlmageed | G06F 17/30796 707/736 |
| 2011/0301935 A1* | 12/2011 | Quirk | G06F 17/278 704/2 |
| 2011/0307252 A1* | 12/2011 | Ju | G10L 15/1822 704/232 |
| 2012/0016678 A1 | 1/2012 | Gruber et al. | |
| 2012/0084086 A1* | 4/2012 | Gilbert | G10L 15/32 704/235 |
| 2012/0265528 A1* | 10/2012 | Gruber | G10L 15/18 704/235 |
| 2013/0159000 A1* | 6/2013 | Ju | G10L 15/1822 704/254 |
| 2013/0268522 A1 | 10/2013 | Barrett | |
| 2013/0304454 A1* | 11/2013 | Kimberly | G06F 17/218 704/9 |
| 2013/0332450 A1 | 12/2013 | Castelli et al. | |
| 2014/0006010 A1* | 1/2014 | Nor | G06F 17/2282 704/9 |
| 2014/0072948 A1* | 3/2014 | Boguraev | G09B 7/00 434/362 |
| 2014/0095147 A1* | 4/2014 | Hebert | G06F 17/2785 704/9 |
| 2014/0101119 A1* | 4/2014 | Li | G06F 17/30657 707/706 |
| 2014/0108424 A1* | 4/2014 | Casella dos Santos | G06F 17/30598 707/748 |
| 2014/0108460 A1* | 4/2014 | Casella dos Santos | G06F 17/30595 707/794 |
| 2014/0165002 A1* | 6/2014 | Grove | G06F 3/0482 715/825 |
| 2014/0297268 A1* | 10/2014 | Govrin | G06Q 40/02 704/9 |
| 2015/0161124 A1* | 6/2015 | Keshava | G06F 17/30905 707/709 |

OTHER PUBLICATIONS

"Google Search history Expands, Becomes Web History"; http://searchengineland.com/google-search-history-expands-becomes-web-history-11016.

Sep. 2, 2014—U.S. Non-Final Office Action—U.S. Appl. No. 13/632,380.

Jun. 24, 2016—U.S. Non-Final Office Action—U.S. Appl. No. 13/632,380.

Nov. 18, 2016—U.S. Final Office Action—U.S. Appl. No. 13/632,380.

Dec. 5, 2016—U.S. Notice of Allowance and Fee(s) Due—U.S. Appl. No. 13/632,380.

Sullivan, Danny, "Google Search History Expands, Becomes Web History," http://searchengineland.com/google-search-history-expands-becomes-web-history-11016, Apr. 19, 2007.

* cited by examiner

MULTI-DOMAIN NATURAL LANGUAGE PROCESSING ARCHITECTURE

TECHNICAL FIELD

The present invention relates to an architecture for natural language processing.

BACKGROUND ART

Natural Language Processing (NLP) and Natural Language Understanding (NLU) involve using computer processing to extract meaningful information from natural language inputs such as human generated speech and text. One recent application of such technology is processing speech and/or text queries in mobile devices such as smartphones.

FIG. 1 shows some example screen shots of one such mobile device application, Dragon Go!, which processes speech query inputs and obtains simultaneous search results from a variety of top websites and content sources. Such applications require adding a natural language understanding component to an existing web search algorithm in order to extracting semantic meaning from the input queries. This can involve using approximate string matching to discover semantic template structures. One or more semantic meanings can be assigned to each semantic template. Parsing rules and classifier training samples can be generated and used to train NLU models that determine query interpretations (sometimes referred to as query intents).

SUMMARY

An ideal architecture for NLP/NLU on a mobile device should permit use of modular components so that it is easy to reuse classifiers, grammars, and entire semantic domains. The arrangement should be compatible with the use of hybrid NLP technologies, for example, combining rule-based and statistical approaches. And it also should be possible to achieve a smooth evolution from an initial prototype to the final system that leverages big data sources.

Embodiments of the present invention embrace the inherent ambiguity in natural language with a multi-domain natural language processing architecture that uses multiple parallel domain pipelines to process natural language inputs such as a speech input query from a smartphone or other mobile device. Ambiguity is preserved throughout the pipelines producing rich N-best lists and the results are ranked and disambiguated late in the process when a global decision can be made.

Embodiments of the present invention are directed to an arrangement and corresponding method for multi-domain natural language processing. Multiple parallel domain pipelines are used for processing a natural language input (also referred to as a "query"). Each domain pipeline represents a different specific subject domain of related concepts. Each domain pipeline includes a mention module that processes the natural language input using natural language understanding (NLU) to determine a corresponding list of mentions, and an interpretation generator that receives the list of mentions and produces a rank-ordered domain output set of sentence-level interpretation candidates. A global evidence ranker receives the domain output sets from the domain pipelines and produces an overall rank-ordered final output set of sentence-level interpretations.

The arrangement may operate in real time to process the natural language input with minimum response latency. The mention module may use both rule-based NLU and statistical-based NLU to determine the corresponding list of mentions. The mention module may also associate additional semantic attachments related to the mentions and include the semantic attachments with the list of mentions to the interpretation generator. The global evidence ranker may also include mentions and semantic attachments with the final output set of sentence-level interpretations. And there may be a confidence value for each mention and/or each interpretation candidate.

The interpretation generator also may determine a query intent representing a semantic meaning of the natural language input to produce the interpretation candidates. The interpretation generator also may extract relationships between mentions to produce the interpretation candidates. And the interpretation generator may perform a semantic re-ranking of the interpretations candidates within the domain output set.

DETAILED DESCRIPTION

Figure 1:
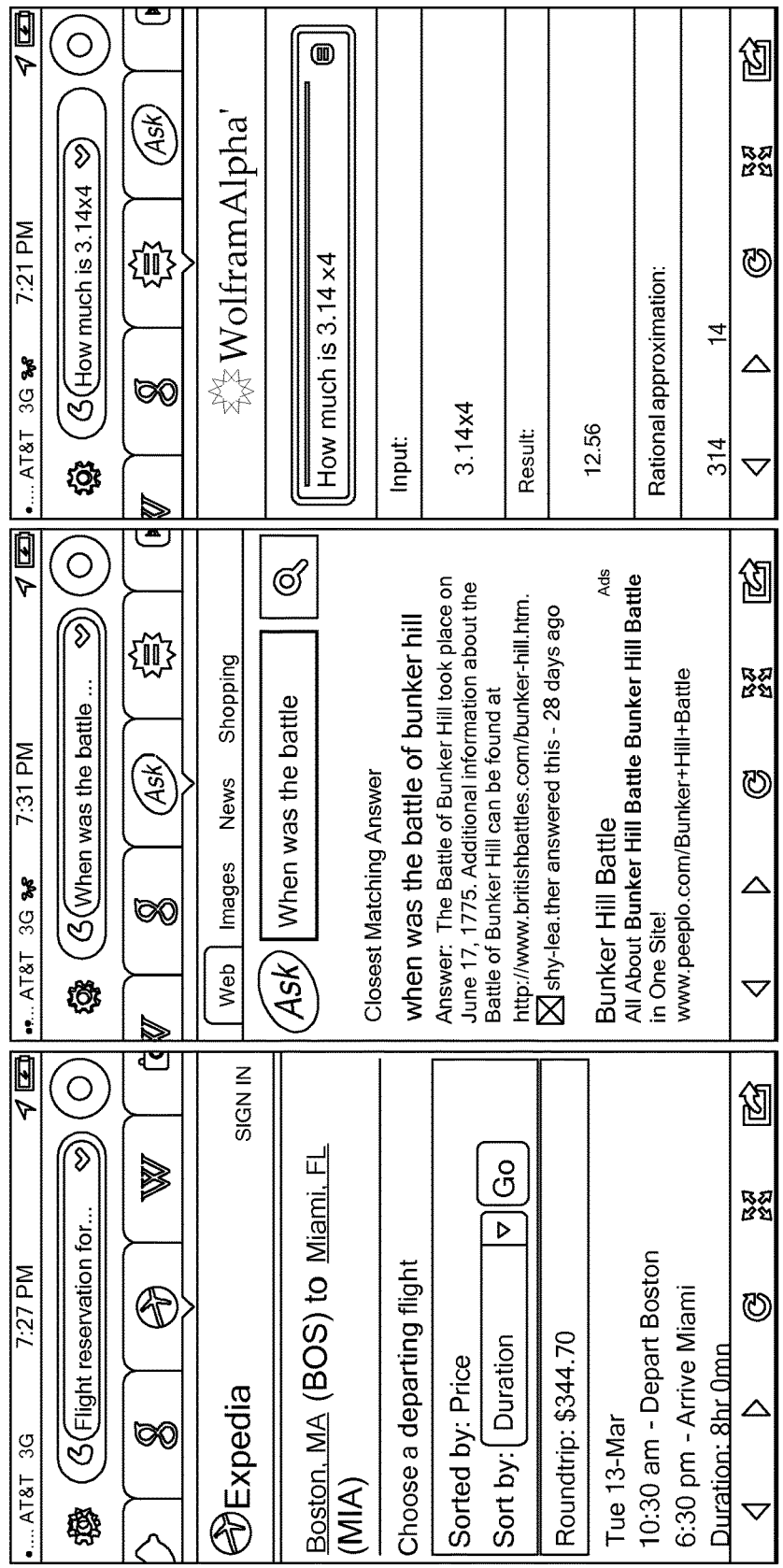
FIG. 1 shows some example screen shots of a natural language query application for a mobile device.
Figure 2:
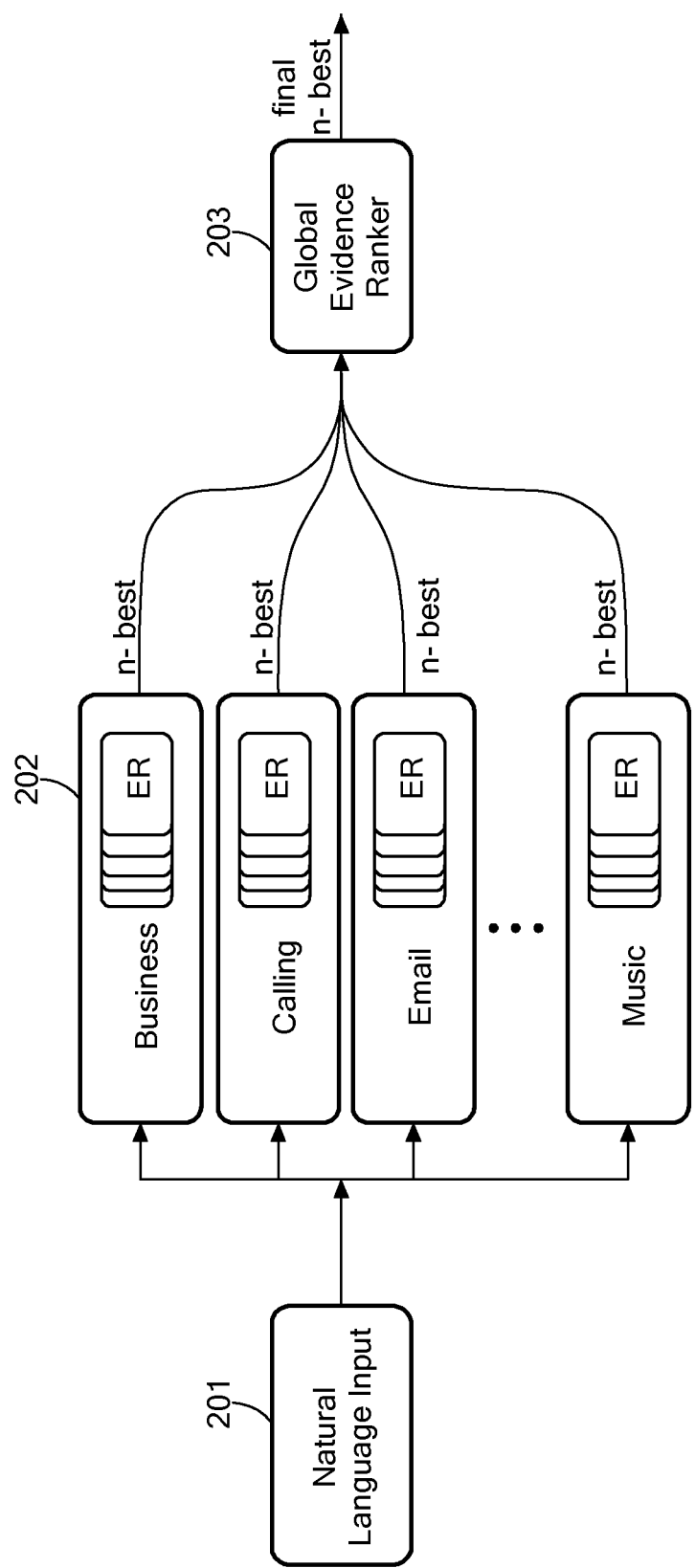
FIG. 2 shows an example of a multi-domain natural language processing architecture according to an embodiment of the present invention.

FIG. 2 shows an exemplary embodiment of the present invention where given a natural language query input 201 such as "search for schedule of miami heat," each domain pipeline 202 assigns specific tags to groups of words within the query that represent individual semantic concepts (e.g., a date, a movie name, etc.) which we refer to as mentions. For example:

[IntentSearch] search for [/IntentSearch]
[SportTeam] miami heat [/Sport Team]

Individual mentions may also receive additional semantic attachments (SemAtt) representing additional associated relationship information. For example, the mention, SportTeam="Miami Heat", may have a SemAtt, TeamURL=www.nba.com/heat. Domain expert interpreters within each domain pipeline 202 are then used to process the mentions and semantic attachments to determine domain interpretation candidates that represent the query. The outputs of all the parallel domain pipelines 202 are funneled together and applied to a global evidence ranker 203 which is typically (but not necessarily restricted to) a classifier trained on relevant data and using features from the domain experts as well as other external sources—for example, current list of in-theater movies, list of popular songs, etc.—to determine a final output interpretation that represents the initial natural language input 201.

Figure 3:
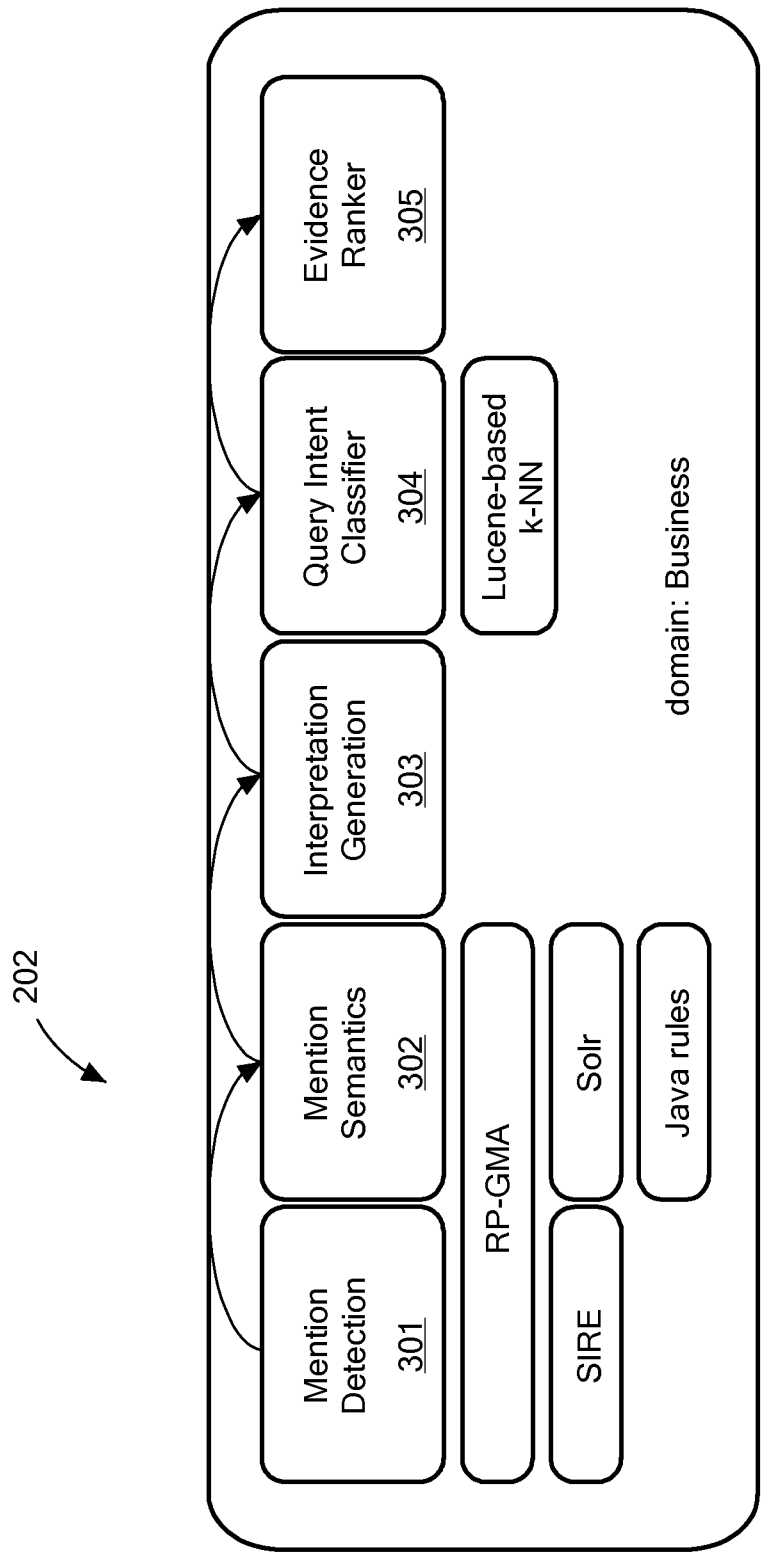
FIG. 3 shows an example of various functional blocks within an individual domain pipeline according to an embodiment of the present invention.

FIG. 3 shows an example of functional blocks within one specific embodiment of a domain pipeline 201. Initially, a mention detection module 301 processes the natural language input using natural language understanding (NLU) to determine a corresponding N-best list of mentions. For example, the natural language input may be a text query as determined by automatic speech recognition of a speech input. Specific NLU algorithms may be rule-based for fast bootstrapping and/or statistical-based for robustness.

Rule-based mention detection is particularly well suited for handling a core high-frequency use cases. Mention detection using robust parsing grammars can be useful for various reasons including without limitation:

- To bootstrap a new system when little or no data is initially available
- To have a deterministic fall back option for simple, core usage
- Highly suitable for internally parsing complex entities such as dates, times, and addresses
- To provide long lists of coverage for businesses, celebrities, music, etc.
- Development can be modularized, dividing different domains among multiple developers (who do need to coordinate to remain in sync on cross-domain mentions).

Grammars are naturally somewhat context-free, though some context can be implemented to identify individual mentions. That is, simpler context-free grammars, in effect, are simply big lists of synonyms. More complex contextual grammars can make peripheral "dips" into other grammars. Specific embodiments may actually use many (e.g., hundreds) of individual robust parsing grammars for each mention type, which may including some overlap so that some specific mention types may be parsed by more than one grammar Use of so many distinct grammars may cost significant loading time (though caching helps) and multiple dips into the same grammar for context can be costly and wasteful (and again, caching may help).

Rule-based mention detection with ambiguous terms and free-form text may also be susceptible to over-generation, producing a large number of ambiguous parses that are all equivalent. If training data is available, weighted grammar rules and/or confidence scoring can be used to avoid this issue.

Statistical mention detection may use various specific approaches, for example, based on named entity recognition using a maximum entropy tagger, which can also provide confidence scoring of the detected mentions. Statistical mention detection produces a short easy-to-rank N-best list. Rule-based grammars produce more ambiguity for a longer, richer N-best list, but the ranking gets harder as a result. There may be various useful features built-in—e.g., lexical, syntactic, dictionary, etc.—and external streams of features can be available. In a hybrid system, a full set of grammars can act as feature extractors for statistical mention detection. Statistical mention detection using a probabilistic approach provides a better use of context, which can be helpful for processing free form text. In addition, the generated set of mentions is more likely to be internally consistent, and (unlike grammars) very large dictionaries can be efficiently leveraged.

Mention semantics module 302 discovers additional semantic information ("semantic attachments") for specific mentions. For example, a semantic attachment for a date could be "2012 Dec. 24" while the surface form of the mention might be "December 24", "Christmas Eve", "day before Christmas", etc. This can be done using rules, for example, Java rules for deriving semantic attachments from mention entity types. In addition or alternatively semantic attachments can be identified using other approaches such as classifiers, information retrieval (e.g., Apache Solr), etc.

In some specific embodiments, the functionality of the mention detection module 301 and the mention semantics module 302 may be combined in and performed by a single mention module, for example, using a Robust Parser Grammar Mention Annotation (RP-GMA) approach. And the specific order in which the mention processing is performed may vary from one embodiment to another. In some embodiments, mention processing may be implemented across multiple different domains where the detected mentions are dumped into a mention pool which is shared by the different domains.

Once a list of mentions has been produced by the mention processing block(s), an interpretation generator 303 is a domain expert interpreter that extracts relationships between mentions and blends the mentions together to form a rank-ordered domain output set of sentence-level interpretation candidates representing the full input utterance. Specific architectural details of the interpretation generator 303 can be chosen to allow independent and individual work in different specific domains so that structural details and system improvements can scale. Adding a new domain need not be risky and the specific arrangement should support performance of parallel computations without introducing accuracy risks. Specific arrangements can profit from mentions that come from multiple different sources such as active application, dialog state, user-specific content, time of day, etc. The interpretation generator 303 may be agnostic of the source of the mentions and it can use default weights or it may be trained using field data.

For example, one specific domain interpretation generator 303 can be defined and invoked by software pseudocode such as:

```
domains {
    Books {
        optional = [ ArtistInfo, IntentBuy, Quality,
            SearchPhrase, Title, IntentKnowledge,
            IntentPlay, IntentReview ] as Set;
        anyof = [Book, Writer, ] as Set;
    }
    Definition {
        script = ig_searchphrase.groovy;
        optional = [ PublicPlaces, SearchPhrase,
            IntentSearch] as Set;
        anyof = [ IntentKnowledge, IntentDefinition] as Set;
    }
}
```

For each defined child interpretation generator, a root interpretation generator inspects the available mentions and where there exists at least one sufficient mention, the root interpretation generator calls the child interpretation generator with the list of acceptable mentions that are available. At the end of this loop, a global interpretation generator rank can be added based on each query intent score from all domain pipelines.

For each defined parallel domain pipeline, the interpretation generator 303 gathers the admissible mentions from the full list of mentions from the previous stages. A finite state machine (FSM) can be built and trained with bare words and mentions. The constructed FSM can be traversed using a best-first, breadth-first or depth-first search to build semantic annotations which are collected and sent to a query intent classifier that sorts them by language model score.

Figure 4A:
FIGS. 4A-D show an example of developing a finite state machine (FSM) for use in an interpretation generator according to an embodiment of the present invention.

FIG. 4 A-D shows an example of a specific FSM constructed for a natural language input of "get directions from memphis to boston mass." FIG. 4A shows the initial form of the FSM as follows:

| From | To | content | cost |
|---|---|---|---|
| 0 | 1 | get | 0.693 |
| 1 | 2 | directions | 0.693 |
| 2 | 3 | from | 0.693 |
| 3 | 4 | memphis | 0.693 |
| 4 | 5 | to | 0.693 |
| 5 | 6 | boston | 0.693 |
| 6 | 7 | mass | 0.693 |

Figure 4B:
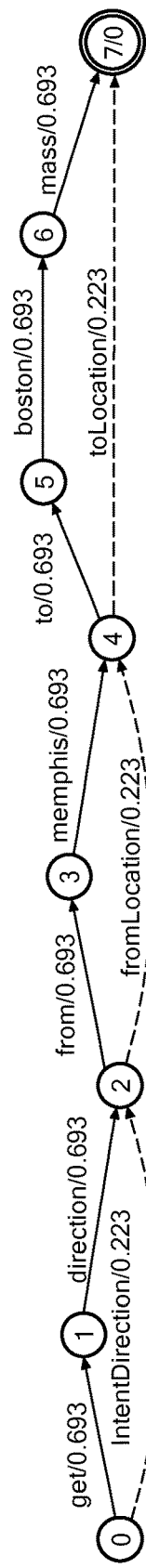

The 0.693 cost come from the costs applied by a robust parsing grammar as compiled from various experimental data. These weights may not be perfectly suited for a given use-case, but they may serve as a reasonable starting point. FIG. 4B shows the initial addition to the FSM of the mentions as follows:

| From | To | Content | Cost |
|---|---|---|---|
| 0 | 2 | IntentDirection | 0.223 |
| 0 | 1 | get | 0.693 |
| 1 | 2 | directions | 0.693 |
| 2 | 4 | fromLocation | 0.223 |
| 2 | 3 | from | 0.693 |
| 3 | 4 | Memphis | 0.693 |
| 4 | 7 | toLocation | 0.223 |
| 4 | 5 | to | 0.693 |
| 5 | 6 | boston | 0.693 |
| 6 | 7 | mass | 0.693 |

Figure 4C:
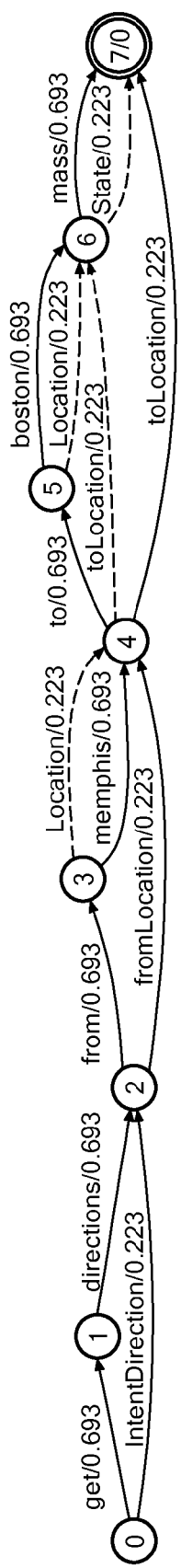

A "longest first" approach may be used: on each node, the arcs are sorted by distance and the "Concept" or "Filler" cost is inserted. FIG. 4C shows the addition of further shorter mention arcs:

| From | To | Content | Cost |
|---|---|---|---|
| 0 | 2 | IntentDirection | 0.223 |
| 0 | 1 | get | 0.693 |
| 1 | 2 | directions | 0.693 |
| 2 | 4 | fromLocation | 0.223 |
| 2 | 3 | from | 0.693 |
| 3 | 4 | Location | 0.223 |
| 3 | 4 | Memphis | 0.693 |
| 4 | 7 | toLocation | 0.223 |
| 4 | 6 | toLocation | 0.223 |
| 4 | 5 | to | 0.693 |
| 5 | 6 | boston | 0.693 |
| 6 | 7 | State | 0.223 |
| 6 | 7 | mass | 0.693 |

Figure 4D:
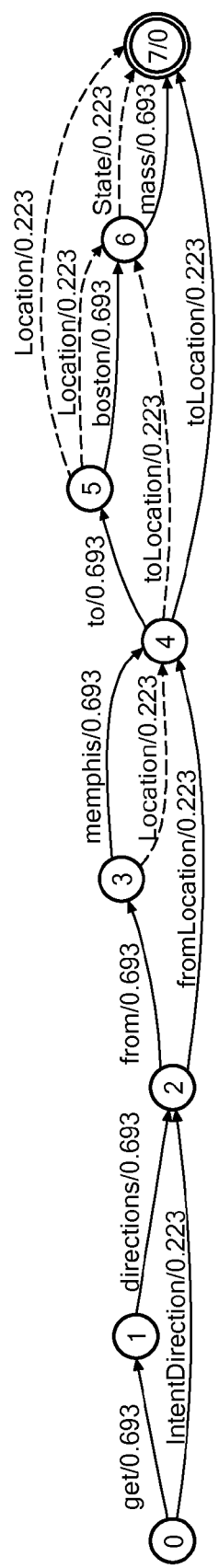

This shows the impact of ambiguity: "from/to Location" can also be understood as just a location or a location and a state. The cumulative cost accumulated for each interpretation as well as the use of semantic templates can help discriminate which choices are better. FIG. 4D shows the impact of a depth-first algorithm with the fourth iteration of the FSM which would move from node 4 to 5 consuming "to" as a filler and would add 5 other interpretations just there. This naïve approach can become a drawback by generating many useless interpretations.

| ## | From | To | Content | Cost | Total Cost |
|---|---|---|---|---|---|
| 0 | 0 | 2 | IntentDirection | 0.223 | |
|   | 2 | 4 | fromLocation | 0.223 | |
|   | 4 | 7 | toLocation | 0.223 | 0.669 |
| 1 | 0 | 2 | IntentDirection | 0.223 | |
|   | 2 | 4 | fromLocation | 0.223 | |
|   | 4 | 6 | toLocation | 0.223 | |
|   | 6 | 7 | State | 0.223 | 0.892 |
| 3 | 0 | 2 | IntentDirection | 0.223 | |
|   | 2 | 4 | fromLocation | 0.223 | |
|   | 4 | 6 | toLocation | 0.223 | |
|   | 6 | 7 | mass | 0.693 | 1.362 |

The interpretation generator 303 can traverse the FSM using a best-first, breadth-first or depth-first search to build semantic annotations. However, a depth-first algorithm can be wasteful of time, even with pruning enabled. Once all the annotations are collected, the interpretation generator 303 sends these on to the next stage.

The described embodiment of the interpretation generator 303 provides flexibility in blending mentions from various sources to benefit from the stability of grammars and the deduction power of statistical engines. And different algorithms and/or configurations can be used based on the specific subject domain. The described embodiment of the interpretation generator 303 also is robust and works well with mention detections sources that may have good recall but poor precision. Embodiments of the interpretation generator 303 may also be able to filter mentions and skip domains based on quality factors.

Unless a real language model is implemented, the interpretation generator 303 will treat all mentions with equal weight, and it may be difficult to add guessing rules. To distinguish between reasonable and unreasonable mentions it may be useful to rely on a database of templates. The issue of over-generation may also need to addressed, and a lack of data may impair pruning ability. If enough data is available, then it may be viable to use a true language model to direct the search and/or possibly train a probabilistic parser.

The query intent classifier 304 can leverage expert knowledge and training data to determine a query intent representing a semantic meaning of the natural language input to produce the sentence-level interpretation candidates that represent overall intent of the input query. Ideally, any specific design should be able to become operational before a significant data stream of training data is ready, and then seamlessly integrate field data when it becomes available. This suggests use of a fuzzy match approach that does not depend on perfect coverage in the training data.

The query intent classifier 304 can be implemented using a mixture of rule-based, information retrieval and/or classifier algorithms. For example, a Lucene-based k-nn algorithm can be used where the mentions form semantic templates which are used as the Lucene vector instances, where each word is one coordinate of a Lucene term. The query intent classifier 304 performs a search with terms from the query annotation. The distance function may be a sort of tf*idf-based distance, and scores can normalized to 1 using the perfect match score.

For example, for the input query "play boston", the following annotations are a likely result of the query intent classifier 304:

1[IntentPlay] play [/IntentPlay] [Location] boston [/Location]

[IntentPlay] play [/IntentPlay] [Artist] boston [/Artist]

The dip in the semantic template database will be done with:
IntentPlay Location→not good match
  MapSearch: MapSearch-NA-Location, score 0.085
IntentPlay Artist→perfect match
  Music: Music-Artist-Play, score 1.000

Semantic templates are reduced annotations where the mention markers and the text contained in-between are replaced by the mention name. In addition, at some point, relations are found between two mentions. For example, in "add Bob to the meeting", the mention of the intention to "add" relates to the mention of a person ("bob"). The relationship is different for "add a meeting with Bob".

The query intent classifier 304 can be bootstrapped with a few hand-written templates, making it very predictable, but it can also be rather sensitive to any annotation errors. It can be difficult to add guessing rules. In specific embodiments, the classification of the query intent classifier 304 may be decoupled from the earlier mention processing passes. The output of the query intent classifier 304 is the same as from the interpretation generator 303 but with the added query's intent. It may be possible to implement the query intent classifier 304 without significant training data. The manual addition of a template can readily fix certain coverage bugs, and the manual templates can seamlessly merge with field data as it becomes available.

There may occasionally be collisions with the same template and two intents. Some embodiments may also lack a notion of frequency, even when data is available. In addition, the template database can tend to become rather unwieldy, especially with complex domains. It may be possible to use reduced templates successfully, but granularity can be lost.

As an interpretation is built in a particular domain pipeline 202, evidence is accumulated that supports or refutes each hypothesis, and a ranking algorithm can be trained based on this evidence. Thus, before exiting the domain pipeline 202, a domain evidence ranker 305 performs a semantic re-ranking of the interpretation candidates within the domain output set. For example, the domain evidence ranker 305 may typically (but not necessarily) be a classifier trained on data representative of the task. The domain evidence ranker 305 uses some knowledge about the list of candidate interpretations to improve discrimination. If designed properly, the features being fed into this classifier may be language and application independent. Rather than trying to figure out absolutely how good a hypothesis is, the domain evidence ranker 305 just needs to know if it's better than some other item in the list of candidate interpretations, which is a relative decision about the hypothesis and easier to do. Here the incoming candidate interpretations come from multiple diverse sources and the domain evidence ranker 305 needs to combine concepts from grammars, statistical methods, DB searches, etc.

Thus the domain evidence ranker 305 could rank the list of interpretation candidates in various different specific ways including concept coverage, likelihood, and/or contextual information about the semantic entities (e.g., a current movie may be more likely than an out-of-print book). Any existing ambiguity will be preserved, the domain evidence ranker 305 just ranks it. A specific embodiment should be trainable, robust and sustainable, and may or may not be application dependent. This can be achieved by a simple implementation without rules that just ranks the candidate interpretations using a trained classifier. Or a more complex implementation may be chosen that includes evidence weighting heuristics, etc.

For example, the domain evidence ranker 305 may use a specific ranking method based on a logistic regression approach or a pairwise ranking approach. In a specific example of a pairwise approach referred to as SVMrank, for each hypothesis $h_i$, the domain evidence ranker 305 extracts a feature vector $f(h_i)$. For each pair $\langle f(h_i), f(h_j) \rangle$ SVMrank then predicts which is better. This approach uses knowledge about the interpretation candidate list, but it is quadratic on the number of candidates, which affects efficiency for both training and testing. The output of the domain evidence ranker 305 is a re-sorted list of sentence-level query interpretations.

Some embodiments may implement the domain evidence ranker 305 using an approach based on conditional random fields. That is, a log-linear model can be characterized:

$$p_{\overline{\alpha}}(y \mid x) = \frac{1}{Z(x, \overline{\alpha})} \exp(\Phi(x, y) \cdot \overline{\alpha})$$

conditioned on the hypotheses in the N-best:

$$Z(x, \overline{\alpha}) = \Sigma_{y \in GEN(x)} \exp(\phi(x, y) \cdot \overline{\alpha})$$

where $\overline{\alpha}$ is a weighting factor and $\phi(x, y)$ are features that represent supporting/refuting evidence, for example, mention detection confidences, classification scores, coverage statistics, language model scores, pre-rank from the interpretation generator, etc. Such an approach re-ranks items relatively quickly, and training is not particularly difficult. The ranker may be very sensitive to a few key features (e.g., language model score, query intent score, etc.) and re-training while meeting regression tests may be challenging.

Embodiments of the present invention also may include a confidence value for any or all of the various processing parts including without limitation mentions, semantic attachments, query intent, and/or interpretation candidates. A confidence model can be trained to predict for each independent hypothesis how likely it is to be relevant to determining the semantic interpretation of the natural language input. For example, a confidence model may be based on a logistic regression approach using data features that represent supporting or refuting evidence in order to rank each hypothesis on a relevance probability. A language independent feature may be used to determine a confidence value via a heuristic, a classifier score, or some other means. This may be only a matter of using the output score of the single algorithm that provides the data feature. For example, the confidence of interpretation candidates may be a score from the domain evidence ranker. Or a separate statistical confidence engine can be run using a regression model on the ranked output. The determined confidence values can be included with the outputs of each stage, for example, with the mentions in the N-best list output of the mention processing block.

Overall the individual semantic concept domain pipelines 202 blend mentions from various different sources that combine the stability of grammars with the deduction power of statistical engines. This approach allows for different algorithms and configurations based on the specific subject domain, thereby obtaining desirable robustness working well with mention sources that may have good recall but poor precision. Specific arrangements can filter mentions and/or skip specific concept domains based on quality.

A global evidence ranker 203 receives the domain output sets from the individual domain pipelines 202 and produces an overall rank-ordered final output set of sentence-level interpretations. Thus, the global evidence ranker 203 acts to arbitrate between many different domain experts by ranking their various interpretations. As each particular domain pipeline 202 builds its interpretation candidates, evidence is gathered and accumulated that supports or refutes each hypothesis. A ranking algorithm can be trained based on this evidence. A global rank can be assigned, for example, based on the score from the query intent classifier 304 within each domain pipeline 202. The global evidence ranker 203 may also include mentions and semantic attachments with the final output set of sentence-level interpretations.

Because of the modular nature of the system architecture, whenever more data becomes available or a new statistical model is added, only the mention model needs re-training. Optionally (for optimal performance), the domain re-ranker also might be re-trained. Other system components should be stable. The use of parallel domain pipelines supports many different domain expert interpreters, which helps generate useful competing interpretations. For example, given the natural language input "buy harry potter," does the user want to buy the book or the dvd? Domains such as "Movie" and "Books" would return good scoring interpretations and make a richer N-Best list of interpretation candidates.

Many individual models and grammars may be language- and application-dependent, but the overall system architecture and some models (such as confidence models, ranking models, etc.) will be independent of the language and application. The system architecture leverages classifiers and information retrieval techniques that use abstract features as much as possible so that, whenever possible, features that are independent of the words themselves are used. That allows the classifiers (and other algorithms) to be used across different languages and different applications. Moreover, the parallel pipeline approach allows easy removal and/or addition of specific domain experts as desired to allow easy plug-and-play of different subject domains. The entire system may operate in real time to process the natural language input with minimum response latency.

Embodiments of the invention may be implemented in whole or in part in any conventional computer programming language such as VHDL, SystemC, Verilog, ASM, etc. Alternative embodiments of the invention may be implemented as pre-programmed hardware elements, other related components, or as a combination of hardware and software components.

Embodiments can be implemented in whole or in part as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method comprising:
    receiving, by a computing system, data representing an utterance spoken by a user and comprising a query;
    for each group of a plurality of groups of words included in the utterance and responsive to a determination that words included in the group are related to one another by a semantic concept and a semantic attachment, adding, by the computing system, the group to a pool of groups shared by a plurality of different domain pipelines, wherein the semantic concept is associated with a surface form of an individual mention and the semantic attachment is related only to the individual mention;
    processing, by the computing system, in parallel, and for each domain pipeline of the plurality of different domain pipelines, the data in accordance with one or more natural language understanding (NLU) models of the domain pipeline based on the individual mention and the semantic attachment to produce a plurality of output sets for the query, each domain pipeline corresponding to a different subject domain of a plurality of related concepts, and each output set of the plurality of output sets comprising a ranking of a plurality of interpretation candidates determined by the domain pipeline for the query; and
    re-ranking, by the computing system and for each output set of the plurality of output sets, the plurality of interpretation candidates to determine an interpretation of the query.

2. The method of claim 1, wherein the processing comprises, for each domain pipeline of the plurality of different domain pipelines, processing each group of words included in the shared pool in accordance with the one or more NLU models of the domain pipeline.

3. The method of claim 1, comprising ranking, by the computing system, for at least one domain pipeline of the plurality of different domain pipelines, and based on the semantic attachment corresponding to one or more words included in the utterance, the plurality of interpretation candidates determined by the domain pipeline for the query.

4. The method of claim 3, wherein the re-ranking is based on the semantic attachment.

5. The method of claim 4, wherein the semantic attachment comprises a uniform resource locator (URL) determined based on the one or more words.

6. The method of claim 4, wherein the semantic attachment comprises a date determined based on the one or more words.

7. The method of claim 4, wherein the re-ranking is based on data received by the computing system from an external source using the semantic attachment.

8. A system comprising:
   at least one processor; and
   a memory comprising instructions that when executed by the at least one processor cause the system to:
   receive data representing an utterance spoken by a user and comprising a query;
   for each group of a plurality of groups of words included in the utterance and responsive to a determination that words included in the group are related to one another by a semantic concept and a semantic attachment, add the group to a pool of groups shared by a plurality of different domain pipelines, wherein the semantic concept is associated with a surface form of an individual mention and the semantic attachment is only related to the individual mention;
   process, in parallel, and for each domain pipeline of a plurality of different domain pipelines, the data in accordance with one or more natural language understanding (NLU) models of the domain pipeline to produce a plurality of output sets for the query, each domain pipeline corresponding to a different subject domain of a plurality of related concepts, and each output set of the plurality of output sets comprising a ranking of a plurality of interpretation candidates determined by the domain pipeline for the query; and
   re-rank, for each output set of the plurality of output sets, the plurality of interpretation candidates to determine an interpretation of the query.

9. The system of claim 8, wherein the instructions, when executed by the at least one processor, cause the system to:
   for each domain pipeline of the plurality of different domain pipelines, process each group of words included in the shared pool in accordance with the one or more NLU models of the domain pipeline.

10. The system of claim 8, wherein the instructions, when executed by the at least one processor, cause the system to rank, for at least one domain pipeline of the plurality of different domain pipelines, and based on the semantic attachment corresponding to one or more words included in the utterance, the plurality of interpretation candidates determined by the domain pipeline for the query.

11. The system of claim 10, wherein the instructions, when executed by the at least one processor, cause the system to re-rank the plurality of interpretation candidates based on the semantic attachment.

12. The system of claim 11, wherein the semantic attachment comprises a uniform resource locator (URL) determined based on the one or more words.

13. The system of claim 11, wherein the semantic attachment comprises a date determined based on the one or more words.

14. The system of claim 11, wherein the instructions, when executed by the at least one processor, cause the system to re-rank the plurality of interpretation candidates based on data received by the system from an external source using the semantic attachment.

15. One or more non-transitory computer-readable media comprising instructions that when executed by one or more computers cause the one or more computers to:
   receive data representing an utterance spoken by a user and comprising a query;
   for each group of a plurality of groups of words included in the utterance and responsive to a determination that words included in the group are related to one another by a semantic concept and a semantic attachment, wherein the semantic concept is associated with a surface form of an individual mention and the semantic attachment is related only to the individual mention, add the group to a pool of groups shared by a plurality of different domain pipelines;
   process, in parallel, and for each domain pipeline of a plurality of different domain pipelines, the data in accordance with one or more natural language understanding (NLU) models of the domain pipeline based on the individual mention and the semantic attachment to produce a plurality of output sets for the query, each domain pipeline corresponding to a different subject domain of a plurality of related concepts, and each output set of the plurality of output sets comprising a ranking of a plurality of interpretation candidates determined by the domain pipeline for the query; and
   re-rank, for each output set of the plurality of output sets, the plurality of interpretation candidates to determine an interpretation of the query by selecting a best-ranked interpretation candidate from among the plurality of output sets.

16. The one or more non-transitory computer-readable media of claim 15, wherein the instructions, when executed by the one or more computers, cause the one or more computers to:
   for each domain pipeline of the plurality of different domain pipelines, process each group of words included in the shared pool in accordance with the one or more NLU models of the domain pipeline.

17. The one or more non-transitory computer-readable media of claim 15, wherein the instructions, when executed by the one or more computers, cause the one or more computers to rank, for at least one domain pipeline of the plurality of different domain pipelines, and based on the semantic attachment corresponding to one or more words included in the utterance, the plurality of interpretation candidates determined by the domain pipeline for the query.

18. The one or more non-transitory computer-readable media of claim 17, wherein the instructions, when executed by the one or more computers, cause the one or more computers to re-rank the plurality of interpretation candidates based on the semantic attachment.

19. The one or more non-transitory computer-readable media of claim 18, wherein the semantic attachment comprises at least one of a uniform resource locator (URL) determined based on the one or more words or a date determined based on the one or more words.

20. The one or more non-transitory computer-readable media of claim 18, wherein the instructions, when executed by the one or more computers, cause the one or more computers to re-rank the plurality of interpretation candidates based on data received by the one or more computers from an external source using the semantic attachment.

* * * * *